Feb. 18, 1936.  J. MERCIER  2,031,000
DAMPING DEVICE
Filed Jan. 23, 1935  2 Sheets-Sheet 1

Jean Mercier
INVENTOR his ATT'y.

Feb. 18, 1936.  J. MERCIER  2,031,000
DAMPING DEVICE
Filed Jan. 23, 1935  2 Sheets-Sheet 2

Jean Mercier
INVENTOR
By [signature]
his ATT'Y.

Patented Feb. 18, 1936

2,031,000

UNITED STATES PATENT OFFICE 2,031,000

DAMPING DEVICE

Jean Mercier, Neuilly-sur-Seine, France

Application January 23, 1935, Serial No. 3,034
In Germany January 26, 1934

7 Claims. (Cl. 188—88)

The present invention relates to shock-absorbers of the fluid type, which are particularly applicable to spring suspensions for vehicles, of the class in which a deformable chamber may communicate with an auxiliary chamber through conduits controlled by valves, which permit, according to the direction of the variation of volume of said deformable chamber, starting from its normal volume, the circulation of the fluid to or from the said deformable chamber, and which prevent the circulation of the fluid in the contrary direction when the said deformable chamber returns to its normal volume.

The present invention is chiefly characterized by the fact that the said valves are secured to an auxiliary piston or a flexible diaphragm pierced with a small orifice connecting the deformable chamber or the auxiliary chamber with a third chamber in which the pressure remains practically equal to the static load of the vehicle, or in any case, to the mean pressure of the spring suspension.

Due to this arrangement, the valves can open the conduits for the fluid, on the return movement, only when the pressure in the deformable chamber has again become practically equal to the pressure counterbalancing the static load of the vehicle.

The accompanying drawings represent by way of example, in longitudinal section, four forms of execution of the object of the invention, as applied to a spring suspension arrangement for motor vehicles.

Figure 1:
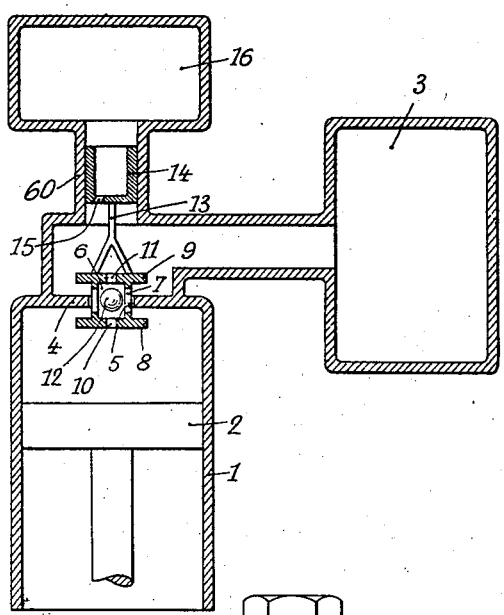

Referring to the example of execution shown in Fig. 1, a cylinder 1 secured to the chassis of the vehicle has movable therein with a snug sliding fit a piston 2, connected with the axle of the vehicle. This cylinder is separated from an auxiliary chamber 3 by a partition 4 which is pierced with an aperture 5. In this aperture is slidable a barrel 6 which is pierced with longitudinal apertures 7 and is terminated by discs 8 and 9, pierced with apertures 10 and 11. A ball 12 is movable in the said barrel and may close one or the other of the apertures 10 and 11. The device formed by the barrel and the discs 8 and 9 is connected, by a rod 13, with an auxiliary piston 14, guided with a snug sliding fit in a tubular part 60 and, pierced with a small orifice 15 affording communication with a chamber 16 having a sufficient volume in order that the pressure in said chamber shall not be appreciably modified for slight displacements of the auxiliary piston 14. The diameter of the auxiliary piston 14 is in general equal to that of the barrel 6, and thus the device 6—8—9—13—14 will not be affected by the pressure prevailing in the auxiliary chamber 3 and acting in contrary directions upon the piston 14 and the barrel 6. Thus the said device will be displaced only by the effect of the difference between the pressures prevailing in the cylinder 1 and the chamber 16. When the device is in the idle position, the disc 9 is in contact with partition 4 due to gravity, and as the piston 2 is connected with the axle, and the cylinder 1 with the chassis, there will prevail in the cylinder 1, in the auxiliary chamber 3 and in the chamber 16, a pressure which is equal to the static load of the vehicle, the cylinder 1 and the chamber 3 communicating through the apertures 11 and 7. The small orifice 15 provides for the admission and the discharge of the fluid, in such way that the pressure in the chamber 16 will be always adapted to the variable static loads of the vehicle which may modify the various relative positions of the piston 2. As the orifice 15 is very small, it permits slow variations of pressure depending upon the load of the vehicle, but it does not permit the rapid movements of the spring suspension, when passing over obstacles of modifying to any appreciable degree the pressure in the chamber 16.

When, as the result of a shock, the piston 2 moves further into the cylinder 1, the compressed fluid drives the disc 8 against the partition 4, and gives, in consequence, to the barrel 6, the rod 13 and the piston 14, a slight displacement corresponding to the amount of movement effected by barrel 6 before disc 8 thereof contacts partition 4; this slight displacement makes little or no change in the pressure in the chamber 16. When the piston 2 continues to move, the compressed fluid raises the ball 12 and thus flows freely from the cylinder 1 into the auxiliary chamber 3. During the return movement into the idle position, the fluid in the auxiliary chamber tends to return into the cylinder 1, but it is prevented from so doing by the ball 12 which is applied against the aperture 10 of the disc 8. In order that the fluid may flow from the chamber 3 into the cylinder 1, it is thus necessary that the disc 8 be separated from the partition 4, which can only take place when the piston 2 has moved sufficiently towards its idle position in order that the pressure in the cylinder 1 shall be reduced to at least the value of the pressure prevailing in the chamber 16.

When, on the contrary, the shock has the effect of withdrawing the piston 2 in the cylinder 1, the fluid flows from the chamber 3 into the cylinder 1, the disc 9 remaining applied against the partition 4. On the return movement, the fluid is prevented from flowing from the cylinder 1 into the chamber 3 by the ball 12 which is applied by pressure against the aperture 11 in the disc 9. Hence it is necessary, in order that the fluid may return into the chamber 3, that the disc 9 be separated from the partition 4, which can take place only when the piston 2 is driven sufficiently into the cylinder 1 in order that the pressure in this cylinder shall attain, at least, the value of the pressure in the chamber 16.

Figure 2:
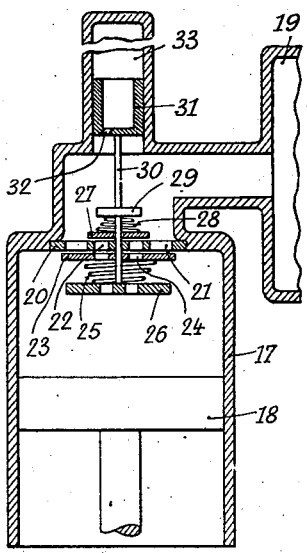

In the form of execution represented in Fig. 2, a cylinder 17 in which is movable with a snug sliding fit a piston 18, is separated from an auxiliary chamber 19 by a partition 20 pierced with two sets of apertures 21 and 22. The outer apertures 21 are normally closed by a disc 23 having the perforations 24. This disc 23 is normally urged against the partition 20 by a spring 25 of small force which bears against a disc 26. The central apertures 22 in the partition 20 are, in like manner, normally closed by a disc 27 which is urged against the partition 20 by a spring 28 bearing against a collar 29. The collar 29 and the disc 26 are connected together by a rod 30 which is slidable, with minimum play, in the discs 23 and 27. This rod 30 extends upwardly, and carries at its upper end an auxiliary piston 31 guided with a snug sliding fit and pierced with a small orifice 32 making connection with a chamber 33 having a sufficient volume in order that the pressure in said chamber, which is equal to the static load of the vehicle, shall not be modified to any appreciable degree for slight displacements of the auxiliary piston 31.

When under the effect of a shock, the piston 18 is driven further into the cylinder 17, the fluid which is compressed will drive the disc 26 and the disc 23 against the partition 20, and thus the fluid may flow without difficulty from the cylinder 17 into the auxiliary chamber 19 through the apertures 24 and 22, while raising the disc 27. The displacement of the disc 26 and the disc 23 will effect the lifting—through the intermediary of the rod 30—of the auxiliary piston 31, but this displacement is sufficiently slight in order that it will not change the pressure in the chamber 33. During the return movement to the idle position, the fluid in the auxiliary chamber tends to return into the cylinder 1, but it can no longer pass through the apertures 22 and 24, as the disc 27 is at this time applied against the partition 20. Thus the fluid cannot return to the cylinder 1 except by lowering the disc 23, the spring 25 and the disc 26, which can only take place when the pressure in the cylinder 1 has fallen, at least, to the value of the pressure prevailing in the chamber 33.

Starting from the idle position, if the piston 18 moves, on the contrary, in the backward direction in the cylinder 17, the operation is the opposite to what has been above indicated, as set forth with reference to Fig. 1.

Figure 3:
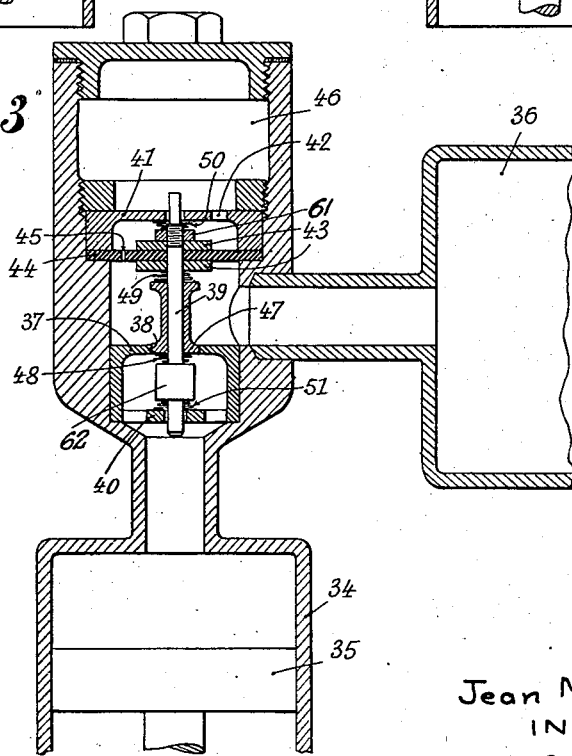

In the form of execution shown in Fig. 3, the auxiliary piston represented in the two preceding examples is replaced by a flexible diaphragm. The cylinder 34, in which a piston 35 is movable with a snug sliding fit, is separated from an auxiliary chamber 36 by a partition 37 pierced with an aperture 38. Through this aperture extends a rod 39, guided in a spider 40 and in a wall 41 pierced with an aperture 42. The rod 39 is connected, through the intermediary of discs 43 and of the lock nut 61 screwed on the rod 39, with a flexible diaphragm 44 pierced with a small orifice 45 making connection with a chamber 46 through the intermediary of the aperture 42. A valve 47, guided upon the rod 39, may slide with a snug fit in the aperture 38. A sleeve or an enlargement 62 is secured on the rod 39. In the idle position, under the action of the counterbalancing springs 48, 49, 50 and 51 the valve 47 closes the aperture 38 and a pressure which is equal to the static load of the vehicle prevails in the chambers 46, 34 and 36.

The operation is analogous to that of the devices shown in the preceding figures. When the piston 35 rises under the effect of a shock, the fluid will flow freely from the cylinder 34 into the auxiliary chamber 36, thus raising the valve 47 and the diaphragm 44, while springs 49 and 50 are compressed and springs 48 and 51 expanded. At the end of the ascending movement of piston 35, the diaphragm 44 and the valve 47 resume their initial position under the action of the springs 48, 49, 50 and 51 and the valve 47 will again close the aperture 38. In order to move downwardly, valve 47 is now obliged to compress springs 48 and 51 and to displace the boss 62 with rod 39 and diaphragm 44, and consequently said valve 47 will only allow the flow of the fluid from the chamber 36 into the cylinder 34 when the pressure in said cylinder has become sufficiently reduced to attract the rod 39 which is held in the raised position by the diaphragm 44.

Figure 4:
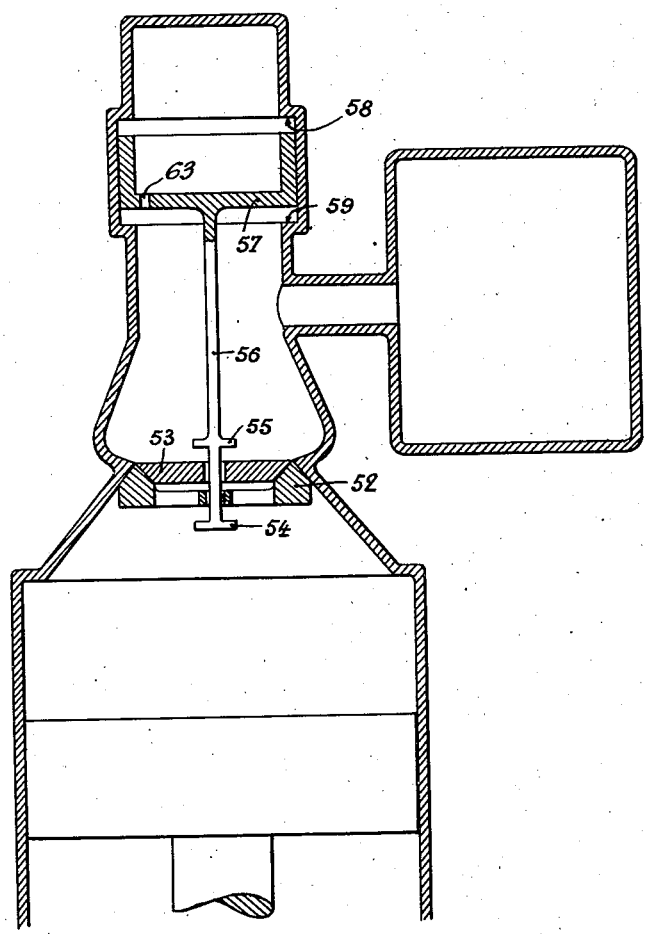

In the embodiment shown in Fig. 4, the valve members 52 and 53 fitting into each other operate in the same manner as the disks 23 and 27 of the device of Fig. 2, and the stop pieces 54 and 55 carried by the rod 56 of the auxiliary piston 57 operate in the same manner as the disks 26 and 29 shown in Fig. 2. The displacements of the piston 57 are limited by the shoulders 58 and 59. Said piston 57 is provided with a small orifice 63 having the same function as orifices 15 and 32 in Figures 1 and 2.

Obviously, the invention is not limited by the examples of execution above described, and numerous modifications may be made in the same without departing from the principle of the invention.

Having now described my invention what I claim as new and desire to secure by Letters Patent is:

1. In a damping device in combination a container, fluid compressing means having two opposite walls adapted to be brought towards and away from each other, one of said walls separating said fluid compressing means from said container, a sliding member adapted to slide in said separating wall, a chamber containing a fluid at a constant pressure, a movable control member subject on one side to the pressure of said chamber and on the other side to the pressure of said container and connected on said other side with said sliding member, communicating means between said container and said fluid compressing means through said separating wall, and valve means operatively connected with said sliding member and adapted to open and to close said communicating means.

2. In a damping device according to claim 1, the further feature consisting in stop pieces adapted to limit the displacements of said sliding member and of said control member.

3. In a damping device according to claim 1, the further feature consisting in a small passage through said control member affording communication between said chamber and said container.

4. In a damping device in combination a container, fluid compressing means having two opposite walls adapted to be brought towards and away from each other, one of said walls separating said fluid compressing means from said container, a sliding member adapted to slide in said separating wall, a chamber containing a fluid at a constant pressure, a movable control member subject on one side to the pressure of said chamber and on the other side to the pressure of said container and connected on said other side with said sliding member, a passage in said separating wall through which said container and said fluid compressing means are adapted to communicate, an obturating member operatively connected with said sliding member and adapted to close said passage for a relative displacement between said opposite walls in one direction, communicating means between said container and said fluid compressing means, and valve means adapted to open said communicating means for the relative displacement between said opposite walls in said one direction and to close the same for a relative displacement in the other direction.

5. In a damping device in combination a container, fluid compressing means having two opposite walls adapted to be brought towards and away from each other, one of said walls separating said fluid compressing means from said container, a sliding member adapted to slide in said separating wall, a chamber containing a fluid at a constant pressure, a movable control member subject on one side to the pressure of said chamber and on the other side to the pressure of said container and connected on said other side with said sliding member, two communicating means between said container and said fluid compressing means, at each end of said sliding member an obturating member adapted to close one of said communicating means, each obturating member being brought in its closed position for a relative displacement between said opposite walls in a contrary direction to the relative displacement causing the other obturating member to be brought in its closed position, and valve means adapted to open one of said communicating means when the relative displacement between said opposite walls brings one of said obturating members into its closed position towards the other communicating means and to close the same communicating means for a relative displacement of said opposite walls in a contrary direction.

6. In a damping device, in combination a container, fluid compressing means having two opposite walls adapted to be brought towards and away from each other, one of said walls separating said fluid compressing means from said container, a sliding member adapted to slide in said separating wall, a chamber containing a fluid at a constant pressure, a movable control member subject on one side to the pressure of said chamber and on the other side to the pressure of said container and connected on said other side with said sliding member, a passage in said separating wall through which said container and said fluid compressing means are adapted to communicate, a first obturating member adapted to close said passage for a relative displacement between said opposite walls in one direction and provided with an aperture, a second obturating member adapted to close said aperture for a relative displacement between said opposite walls in the other direction, and two stop pieces carried by said sliding member on either side of said group of two obturating members and each adapted to be brought into contact with its adjacent obturating member.

7. In a damping device, according to claim 1, the further feature consisting in that said control member is in the form of a flexible diaphragm.

JEAN MERCIER.